Sept. 22, 1964   A. F. ALBANO   3,149,824
AUTOMATIC MIXING SPOON, LADLE, DIPPER OR THE LIKE
Filed Feb. 18, 1963   2 Sheets-Sheet 1

INVENTOR.
ALPHONSO F. ALBANO
BY
ATTORNEY

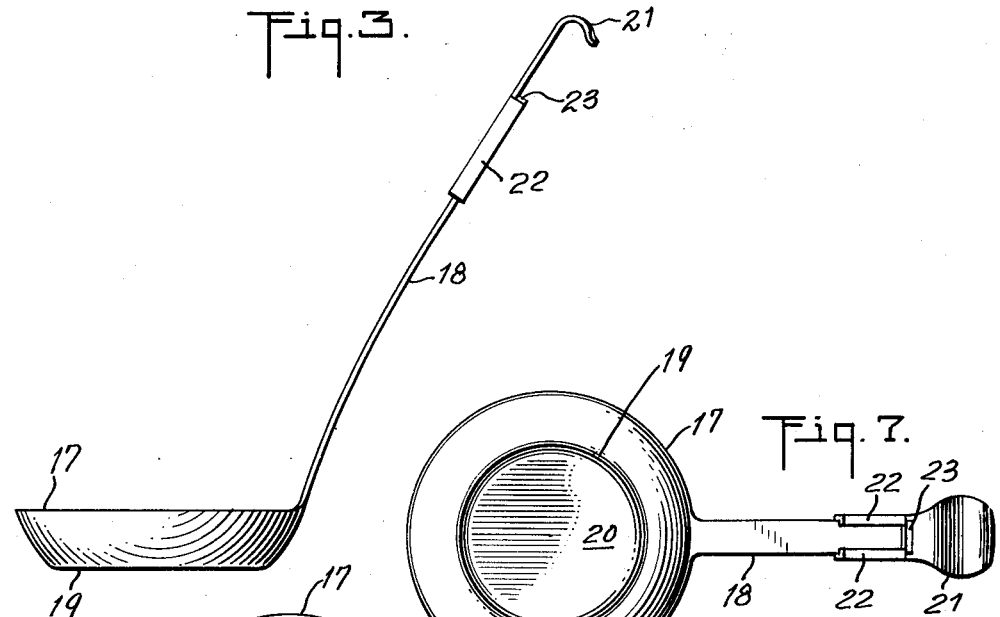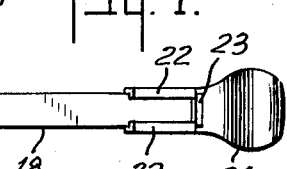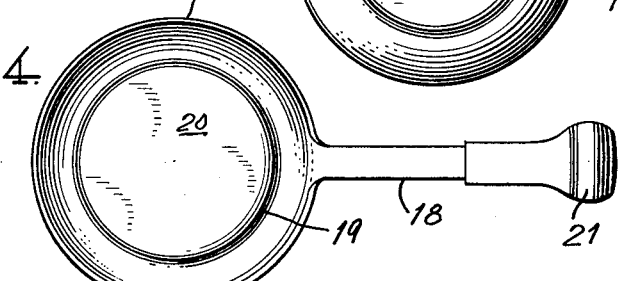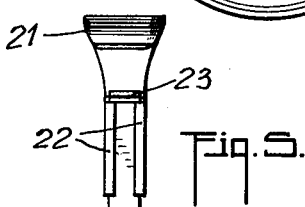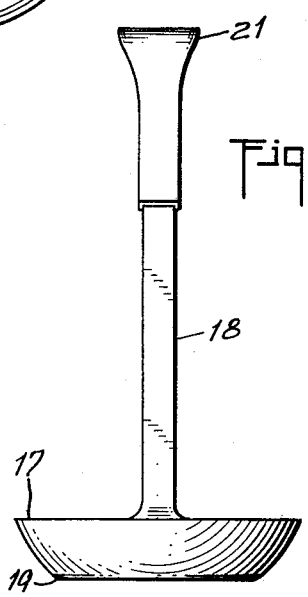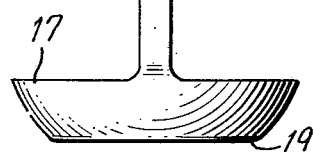

3,149,824
AUTOMATIC MIXING SPOON, LADLE,
DIPPER OR THE LIKE
Alphonso F. Albano, 51 N. Clinton St.,
Poughkeepsie, N.Y.
Filed Feb. 18, 1963, Ser. No. 259,030
1 Claim. (Cl. 259—144)

The invention herein disclosed concerns the mixing and stirring of the contents of cooking and washing vessels.

Objects of the invention have been to provide a simple device which will automatically function to stir or mix liquid contents and which may be used for sampling and stirring such contents apart from such automatic action.

Accordingly the device of this invention is in the nature of a spoon or ladle, which may be used as such in the ordinary way and which has incorporated in it, pressure accumulating and pivotal supporting means, rendering the device self-energizing in operation under heat developed in the liquid contents of a containing vessel.

Details of this novel construction and other special features and objects attained are set forth and will appear in the course of the following specification.

The drawings accompanying and forming part of the specification illustrate certain practical embodiments of the invention but structure may be modified and changed as regards such illustration, all within the true intent and scope of the invention, as hereinafter defined and claimed.

FIG. 1 in the drawings is a broken sectional view of an embodiment of the invention in the form of a stirring spoon, showing it in use as in an ordinary cooking vessel.

FIG. 3 is a side elevation of another embodiment in the nature of a ladle or dipper.

FIG. 4 is a plan view of the same.

FIGS. 5 and 6 are back and front views, and

FIG. 7 is a bottom plan view of this dipper form of the invention.

Figure 1:
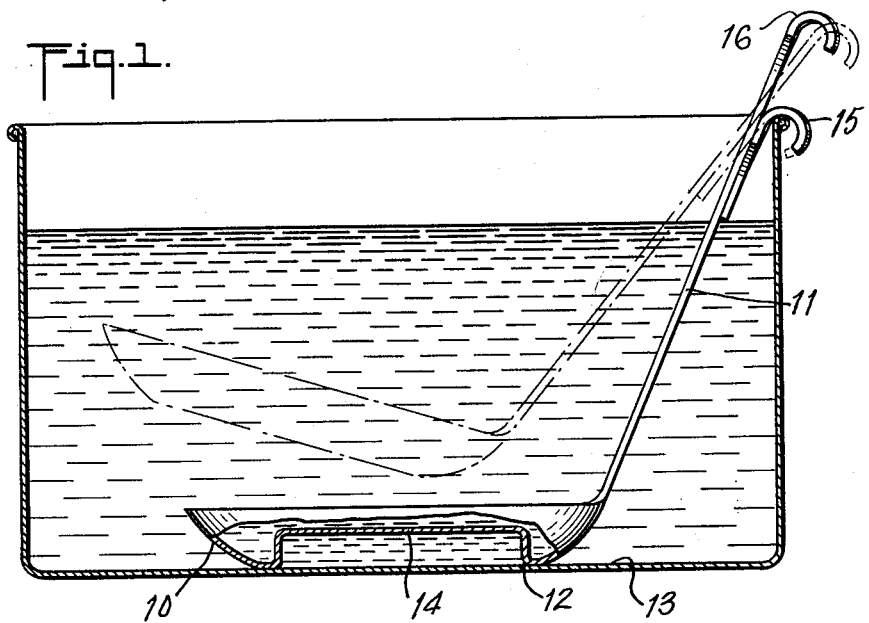
Figure 2:
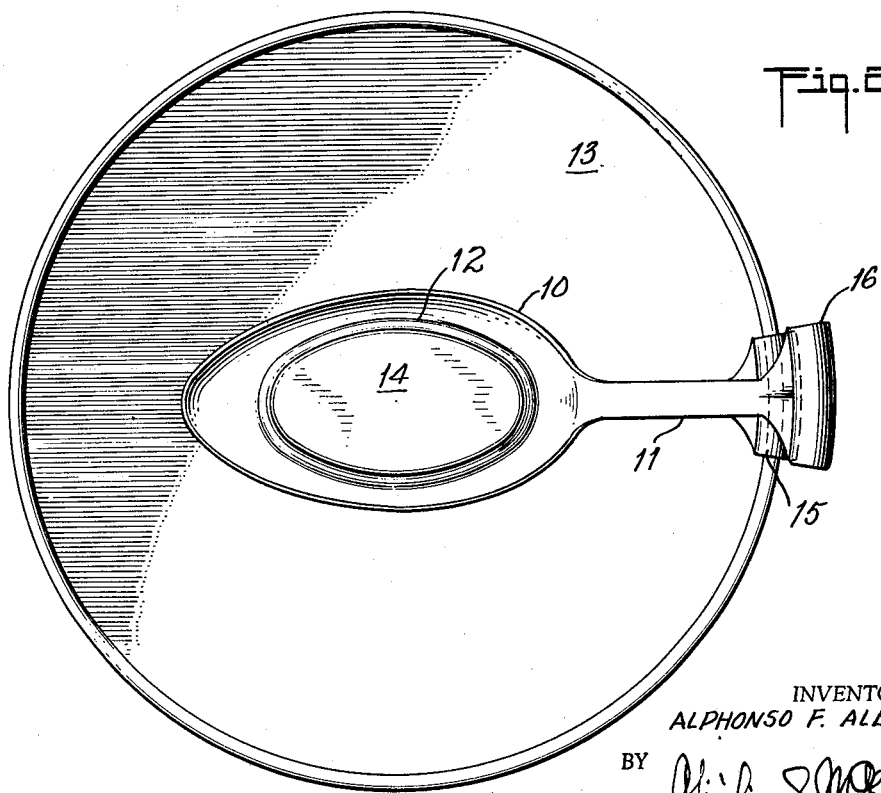
FIG. 2 is a plan view of the same.

In the stirring spoon form of the invention illustrated in FIGS. 1 and 2, the bowl or container portion of the device 10 is shown in elongated spoon shape with a substantially straight handle 11 angled upwardly from the back of the bowl.

The bottom of the bowl has a substantially flat rim portion 12, designed to rest in generally close fitting engagement with the bottom of the pot or other such vessel 13 in which the device is used.

This flat rim portion 12 of the bowl is generally circular in outline providing an annular, more or less complete seal with the bottom of the containing vessel.

Within the outline of the annular seal portion 12 the bottom of the bowl is indented upwardly into a shallow, flat top chamber 14 of less height than the rim of the bowl, designed to confine a small quantity of the vessel contents sufficient to create the pressure necessary to lift the bowl off the bottom.

To control and cofine movements of the spoon or ladle to a limited extent, the handle may be provided with one or more hook elements, such as shown at 15, 16 for pivotal engagement over the rim of the containing vessel.

These pivotal supports are provided on the handle in position to locate the spoon in flat engagement on the bottom of the vessel.

FIGS. 1 and 2 show how a number of these pivotal hook elements may be provided located at different distances from the bowl for use with pots and pans of different size.

Another feature is that these hook elements are extended laterally, as shown in FIG. 2, to provide a wide bearing on the rim of the pot, sufficient to keep the spoon from tipping toward one side or the other.

The broken lines in FIG. 1 show how, under energy developed in the pressure chamber 14 in the bottom of the spoon, the bowl of the spoon will be tipped upwardly about the pivotal center 15, distributing contents of the bowl up into the main body of the liquid, at the same time allowing liquid under pressure to escape from the pressure chamber in the bottom of the spoon into the surrounding contents of the vessel.

Thus a double stirring action is effected, movement of fluid directly upward from the bowl of the spoon and movement of fluid from beneath the bottom of the spoon upwardly around the sides of the same.

In the dipper form of the device shown in FIGS. 3 to 7, the bowl 17 is of more nearly circular outline and a longer handle 18 is provided.

In this construction also the bowl has a flat, annular bottom portion 19 and an upwardly indented or inverted center portion 20 providing a flat pressure chamber to be sealed to the bottom of a containing vessel by the surrounding bottom portion.

In this form illustrated the device is adapted for use with containing vessels of different depth by making the hook element 21, which provides the pivotal support as a slidable member on the upper end of the handle.

This is accomplished in the illustration by making the hook with inturned edges 22 slidably engaged about the edges of the handle and the handle with a cross head 23 at the upper end limiting upward movement and preventing disengagement of the slidable hook.

The shape of the bowl may vary in other ways, the important features being the provision of an inverted pressure chamber in the bottom of the bowl, surrounded by a generally flat portion to make sealing engagement with the bottom of the pan or other container with which the device is to be used.

The pressure chamber indented upwardly into the bowl reduces quantity of liquid the bowl will hold and for that reason the bowl may be somewhat larger than what a corresponding spoon or dipper would be. Preferably the bowl is left with enough holding capacity for use of the spoon, ladle or dipper for its ordinary functions of spooning material, sampling contents and the like.

Also contents held in the bowl will normally be calculated to sufficiently restrain lifting effect and to hold this self-energizing spoon or ladle down to a desired timed pumping action, sufficient to create necessary mixing and simmering without too great disturbance of liquid contents.

What is claimed is:

A spoon, ladle, dipper or the like, for automatically mixing and stirring the contents of a pot by the pressure developed in the heating of the contents of the pot comprising a bowl for complete immersion in liquid contents of the pot while resting on the bottom of the pot, a handle extending up at an angle from the bowl, said handle having a hook at the upper end of the same for pivotal engagement over the rim of the pot in position with the bowl resting on the bottom of the pot, said pivoting hook portion of said handle being extended laterally to steady the handle and bowl against rocking toward one side or the other in the course of pivotal movements of the bowl and handle, said bowl having a generally circular, annular substantially flat bottom portion to seat in continuous close fitting engagement on the bottom of the pot, to thereby seal the bowl to the pot bottom, while pivotally connected by the handle with the rim of the pot, that portion of the bottom of the bowl within the outline of said generally circular flat bottom portion being indented upwardly to a height closely approximating the rim of the bowl and thereby providing a chamber of appreciable dimensions for holding and confining a substantial body of the pot contents against the bottom of the pot and thereby to create pressure beneath the bowl sufficient to lift it off the bottom of the pot to discharge contents of the bowl upwardly into contents of the pot and to effect escape of contents from said pressure chamber upwardly about the sides of the bowl, with such release of pressure permitting the bowl to descend into engagement with the bottom of the pot and thereby continue the rocking, mixing movemens of said spoon, ladle, dipper or the like.

References Cited in the file of this patent

UNITED STATES PATENTS

| 118,140 | Loeb | Aug. 15, 1871 |
| 1,300,008 | Plasclascovitie | Apr. 8, 1919 |
| 2,795,119 | Bair | June 11, 1957 |

FOREIGN PATENTS

| 1,255,211 | France | Jan. 23, 1961 |